(12) United States Patent
Johns

(10) Patent No.: US 11,233,293 B2
(45) Date of Patent: *Jan. 25, 2022

(54) LAMINAR TEXTILE MATERIAL FOR A BATTERY ELECTRODE

(71) Applicant: Clarios Germany GmbH & Co. KG, Hannover (DE)

(72) Inventor: Frank-Thomas Johns, Sarstedt (DE)

(73) Assignee: Clarios Germany GmbH & Co. KG

( * ) Notice: Subject to any disclaimer, the term of this patent is extended or adjusted under 35 U.S.C. 154(b) by 295 days.

This patent is subject to a terminal disclaimer.

(21) Appl. No.: 16/278,600

(22) Filed: Feb. 18, 2019

(65) Prior Publication Data

US 2019/0181411 A1    Jun. 13, 2019

Related U.S. Application Data

(60) Division of application No. 14/697,180, filed on Apr. 27, 2015, now Pat. No. 10,581,046, which is a (Continued)

(30) Foreign Application Priority Data

Dec. 18, 2008  (DE) .................... 102008062765.8

(51) Int. Cl.
  *H01M 50/44*  (2021.01)
  *H01M 4/16*  (2006.01)
  (Continued)

(52) U.S. Cl.
  CPC ............. *H01M 50/44* (2021.01); *H01M 4/14* (2013.01); *H01M 4/16* (2013.01); *H01M 4/20* (2013.01);
  (Continued)

(58) Field of Classification Search
  CPC .... H01M 50/44; H01M 50/46; H01M 50/431; H01M 4/14; H01M 4/16; H01M 4/20;
  (Continued)

(56) References Cited

U.S. PATENT DOCUMENTS 3,486,940 A    12/1969  Samuel
3,765,942 A    10/1973  Jache
(Continued)

FOREIGN PATENT DOCUMENTS

CN    1276920 A    12/2000
CN    1526177 A    1/2004
(Continued)

OTHER PUBLICATIONS

International Search Report for International Application No. PCT/US09/065108 dated Feb. 3, 2010.
(Continued)

*Primary Examiner* — Helen Oi K Conley
(74) *Attorney, Agent, or Firm* — Boardman & CLark LLP

(57) ABSTRACT

The invention relates to a laminar textile material for covering a pasty active mass on a battery electrode. The invention further relates to a battery electrode having such a material, to a battery, and to a method for producing battery electrodes. Potential improvements of lead batteries are disclosed that are more practical than previously known solutions, and that stabilize the pasty active mass on the battery electrodes. A laminar textile material is disclosed to this end, comprising glass fibers and fibers made of a thermoplastic, e.g. polyester.

9 Claims, 2 Drawing Sheets

Figure 1:
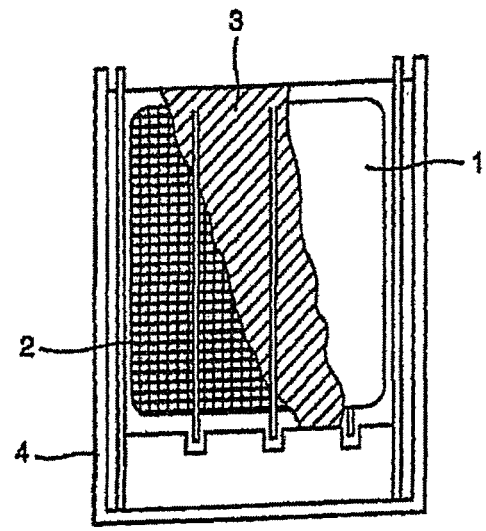

Related U.S. Application Data continuation of application No. 13/140,523, filed as application No. PCT/EP2009/009130 on Dec. 18, 2009, now abandoned.

(51) Int. Cl.

| | | |
|---|---|---|
| *H01M 4/20* | (2006.01) | |
| *H01M 4/22* | (2006.01) | |
| *H01M 10/06* | (2006.01) | |
| *H01M 50/431* | (2021.01) | |
| *H01M 50/46* | (2021.01) | |
| *H01M 50/411* | (2021.01) | |
| *H01M 4/14* | (2006.01) | |
| *H01M 4/38* | (2006.01) | |
| *H01M 4/56* | (2006.01) | |
| *H01M 4/73* | (2006.01) | |
| *H01M 10/08* | (2006.01) | |
| *H01M 4/02* | (2006.01) | |

(52) U.S. Cl.
CPC ............... *H01M 4/22* (2013.01); *H01M 4/38* (2013.01); *H01M 4/56* (2013.01); *H01M 4/73* (2013.01); *H01M 10/06* (2013.01); *H01M 10/08* (2013.01); *H01M 50/411* (2021.01); *H01M 50/431* (2021.01); *H01M 50/46* (2021.01); *H01M 2004/027* (2013.01); *H01M 2220/20* (2013.01); *H01M 2300/0011* (2013.01); *Y10T 29/49115* (2015.01); *Y10T 428/298* (2015.01)

(58) Field of Classification Search
CPC ............ H01M 4/22; H01M 4/38; H01M 4/56; H01M 4/73; H01M 10/06; H01M 10/08
See application file for complete search history.

(56) References Cited

U.S. PATENT DOCUMENTS

| | | | |
|---|---|---|---|
| 3,801,399 | A | 4/1974 | Sundberg |
| 4,205,122 | A | 5/1980 | Miura et al. |
| 4,215,190 | A | 7/1980 | Ferrando et al. |
| 4,342,343 | A | 8/1982 | Harvey et al. |
| 4,367,271 | A | 1/1983 | Hasegawa |
| 4,529,677 | A | 7/1985 | Bodendorf |
| 5,294,319 | A | 3/1994 | Kaczur et al. |
| 5,580,685 | A | 12/1996 | Schenk |
| 5,804,254 | A | 9/1998 | Nedwick et al. |
| 6,096,179 | A | 8/2000 | Elson et al. |
| 6,120,939 | A | 9/2000 | Whear et al. |
| 6,509,118 | B1 | 1/2003 | Pavlov et al. |
| 6,531,248 | B1 | 3/2003 | Zguris et al. |
| 6,803,439 | B2 | 10/2004 | Taylor et al. |
| 6,804,108 | B2 | 10/2004 | Farahmandi et al. |
| 6,939,645 | B2 | 9/2005 | Sugiyama et al. |
| 7,049,251 | B2 | 5/2006 | Porter |
| 7,116,545 | B2 | 10/2006 | Farahmandi et al. |
| 7,132,195 | B2 | 11/2006 | Hottori et al. |
| 7,517,370 | B2 | 4/2009 | Petersen et al. |
| 7,981,818 | B2 | 7/2011 | Justice et al. |
| 8,012,629 | B2 | 9/2011 | Svoboda et al. |
| 8,057,860 | B2 | 11/2011 | Charbonneau |
| 8,221,920 | B2 | 7/2012 | Kawachi et al. |
| 2002/0132167 | A1 | 9/2002 | Rubino et al. |
| 2004/0160156 | A1 | 8/2004 | Ohata et al. |
| 2004/0265699 | A1 | 12/2004 | Choi et al. |
| 2006/0166074 | A1 | 7/2006 | Pan et al. |
| 2008/0096103 | A1 | 4/2008 | Naarmann et al. |
| 2009/0258274 | A1 | 10/2009 | Uensal et al. |
| 2010/0259866 | A1 | 10/2010 | Shaffer et al. |

FOREIGN PATENT DOCUMENTS

| | | |
|---|---|---|
| CN | 1725523 A | 1/2006 |
| CN | 101030642 A | 5/2007 |
| CN | 101039968 A | 9/2007 |
| DE | 1 162 895 | 12/1958 |
| DE | 2 003 131 | 1/1970 |
| DE | 2 137 908 | 7/1971 |
| DE | 2 205 609 | 2/1972 |
| DE | 10 2005 039 709 A1 | 8/2005 |
| EP | 0 109 588 A2 | 5/1984 |
| EP | 0109588 | 5/1984 |
| EP | 432501 A2 | 11/1990 |
| EP | 0850493 | 7/1998 |
| EP | 1 241 720 A2 | 9/2002 |
| FR | 2 492 172 A1 | 4/1982 |
| GB | 762 461 A | 11/1956 |
| GB | 1 362 662 A | 8/1974 |
| GB | 2 081 491 A | 2/1982 |
| JP | 57069664 | 4/1872 |
| JP | 55016364 | 2/1980 |
| JP | 61128461 | 6/1981 |
| JP | 59 029369 A | 2/1984 |
| JP | 60 202665 A | 10/1985 |
| JP | 62103976 | 5/1987 |
| JP | 63 187561 A | 8/1988 |
| JP | 63 279568 A | 11/1988 |
| JP | 01 019678 A | 1/1989 |
| JP | 5054874 A | 3/1993 |
| JP | 6223798 A | 8/1994 |
| JP | 08-180851 A | 7/1996 |
| JP | 11 040133 A | 2/1999 |
| JP | 2001273886 A | 10/2001 |
| JP | 2006196751 A | 7/2006 |
| JP | 2007087871 A | 4/2007 |
| KR | 100250381 B1 | 1/2000 |
| KR | 1002503810000 | 1/2000 |
| KR | 1020050041594 A | 5/2005 |
| KR | 1020060054849 A | 5/2006 |
| KR | 1020060063288 A | 6/2006 |
| KR | 1020060097779 A | 9/2006 |
| KR | 100653246 B1 | 11/2006 |
| KR | 100645970000 | 11/2006 |
| KR | 1006466530000 | 11/2006 |
| KR | 1020060112439 A | 11/2006 |
| KR | 1020060112440 A | 11/2006 |
| KR | 1020060112441 A | 11/2006 |
| KR | 1020070001331 A | 1/2007 |
| KR | 1020070010632 A | 1/2007 |
| KR | 1020070029944 A | 3/2007 |
| KR | 1020070029951 A | 3/2007 |
| KR | 1020070029952 A | 3/2007 |
| KR | 1020070029953 A | 3/2007 |
| KR | 1020070029954 A | 3/2007 |
| KR | 1020070031033 A | 3/2007 |
| KR | 1020070069498 A | 7/2007 |
| KR | 1020070076651 A | 7/2007 |
| KR | 1020070113598 A | 11/2007 |
| KR | 2020080001708 | 6/2008 |
| KR | 1010236760000 | 3/2011 |
| KR | 1010236770000 | 3/2011 |
| KR | 1010236780000 | 3/2011 |
| KR | 1020110023394 A | 3/2011 |
| WO | WO94/17224 | 8/1994 |
| WO | WO 98/01914 | 7/1996 |
| WO | WO 00/08704 A1 | 2/2000 |
| WO | WO 00/75403 A1 | 12/2000 |
| WO | WO01/35474 A1 | 5/2001 |
| WO | WO 01/90444 A1 | 11/2001 |
| WO | WO 03/007404 A1 | 1/2003 |
| WO | WO2005/035841 A2 | 4/2005 |
| WO | WO2007024245 A1 | 3/2007 |
| WO | PCTUS2007/011577 | 5/2007 |
| WO | WO 07/136613 | 11/2007 |
| WO | WO2007/125282 A2 | 11/2007 |
| WO | WO 2007/136613 | 11/2007 |

(56) References Cited

FOREIGN PATENT DOCUMENTS

WO    WO2008051219 A1    5/2008
WO    WO2010/059729 A1    5/2010

OTHER PUBLICATIONS

International Preliminary Report on Patentability for International Application No. PCT/EP09/009130 dated Jun. 30, 2011.
Patrice Simon and Andrew Burke, "Nanostructured Carbons: Double-Layer Capacitance and More," The Electrochemical Society Interface, Spring 2008, pp. 38-43.

LAMINAR TEXTILE MATERIAL FOR A BATTERY ELECTRODE

CROSS-REFERENCE TO RELATED APPLICATIONS

This application claims priority as a divisional application of U.S. application Ser. No. 14/697,180 filed Apr. 27, 2015, which is a continuation application of U.S. application Ser. No. 13/140,523 filed Jun. 17, 2011, which is a national stage application of International Application No. PCT/EP09/009130 which has an international filing date of Dec. 18, 2009, which claims the benefit of German Application No. DE 102008062765.8 which has a filing date of Dec. 18, 2008, the entire contents of each of which are hereby incorporated by reference herein.

BACKGROUND

This invention relates to a textile sheetlike material for covering a pasty active mass on a planar plate-shaped battery electrode. This invention further relates to a planar plate-shaped battery electrode comprising such a material, a battery and also a process for producing such battery electrodes.

It is customary to use lead batteries in vehicles as rechargeable electric energy stores or specifically as starter batteries. A lead battery typically includes positive and negative electrodes and also a dilute solution of sulfuric acid as electrolyte. The electrodes are each coated with an active mass. Lead dioxide can be used as active mass for a positive electrode for example, while spongy lead can be used as active mass for the negative electrode for example. The active mass is applied to the plate-shaped electrodes in pasty form.

Stackwise storage of the plate-shaped electrodes coated with the pasty active mass requires that sticking together of the electrodes must be avoided. Moreover, the relatively sensitive active mass also has to be mechanically stabilized. For this purpose, it was hitherto customary to apply to the active mass a covering layer of paper. The use of paper as covering layer, however, has various disadvantages, including the cellulose fibers of the paper dissolving in the sulfuric acid in operation of the battery and hence no longer being able to contribute to stabilizing the active mass.

To improve this situation, WO 03/007404 A1 proposed forming the covering layer of a fibrous nonwoven web, preferably a polyester nonwoven. However, it has transpired in the meantime that such a polyester nonwoven likewise does not have long durability in operation of the battery. For instance, the battery may occasionally be overcharged in practice. Relatively high temperatures can arise, which as a result of the oxygen forming at the positive electrode leads to destruction of the polyester nonwoven. The polyester nonwoven disintegrates, which has the consequence that the polyester fibers rise to the surface of the liquid electrolyte. Electrically conducting bridges can form together with impurities adhering to the fibers, and lead to shortcircuiting between the positive and negative electrodes and hence to outage of the battery.

It has also already been proposed, by WO 98/01914 A1 for example, to coat the active mass of the electrodes with glass microfiber. However, it has transpired that the veils of glass fibers have an excessively open structure wherethrough the pasty active mass was able to squeeze, which leads to contamination of the electrolyte and hence to outage of the battery. In addition, the glass fiber veil proved to be problematical because of its waviness and deficient breaking strength in the wet state. Therefore, the use of glass fiber veil has also not been successful in practice.

It is an object of the present invention to provide ways to improve lead batteries that are fitter for purpose in practice and stabilize the pasty active mass more securely on the battery electrodes.

The present invention relates to the field of batteries comprising planar, plate-shaped battery electrodes. Such battery electrodes include a frame composed of the electrode material and also a grid produced therein from the electrode material. Such a battery electrode has a pasty active mass applied to it. Batteries comprising electrodes thus constructed are used in particular as starter batteries for vehicles. In contrast for example to batteries that include so-called tubular electrodes, the construction of which is described in DE 36 436 43 C2 for example, and which can be used in particular as traction batteries for electrovehicles, plate-shaped battery electrodes need to be stackable on top of each other for storage in the course of the manufacture of batteries. The tubular electrodes mentioned do not have such a need for example, since there is no stackable storage involved with them and they generally have a different construction in that they do not contain a grid for example.

The invention has the advantage of mechanically stabilizing the pasty active mass in the battery and of preventing the mass being washed away into the electrolyte. This makes it possible to produce cycle-proof batteries having a long durability. Using the invention material with a mixture of glass fibers and fibers composed of a thermoplastic polymer ensures that a covering layer formed therefrom for the pasty active mass will have durability throughout the entire battery life. As a result, there is in particular no need to apply an additional layer of paper. The invention material for covering the pasty active mass is also mechanically appreciably more stable than the prior art materials during the production process of the electrodes, i.e., in the course of application to the battery electrode. The material of the invention is readily fixed to the battery electrode and cut. Stacking the prefabricated battery electrodes is now also possible without damaging the material of the invention, more particularly there is no squeezing of active mass through the covering layer. Even after a storage operation involving the prefabricated battery electrodes, the material of the invention exhibits improved adhesion to the battery electrode compared with the prior art materials.

Nor does the textile sheetlike material of the invention disintegrate in operation of the battery equipped with the battery electrode of the invention, as is the case with the prior art materials for example. Therefore, stability of the covering layer is ensured throughout the battery life. The textile sheetlike material of the invention also does not disintegrate during the process of formation.

In an advantageous development of the invention, polyester fibers are used as fibers composed of a thermoplastic polymer. This allows inexpensive production of the textile material. In addition, polyester fibers are readily available. In an advantageous development of the invention, the glass fibers and/or the fibers composed of a thermoplastic polymer are finely fibrous. It is more particularly advantageous for the fibers to have a diameter of less than 6 μm. This makes it possible to realize a relatively finely fibrous textile structure and thus to avoid the pasty active mass passing (squeezing) through the textile material.

In an advantageous embodiment of the invention, the fibers composed of a thermoplastic polymer have a weight fraction of 5 to 25 percent, based on the material. It has been determined that this makes it possible to achieve particular robustness on the part of the material according to the present invention.

In an advantageous development of the invention, the textile material, in addition to the glass fibers and the fibers composed of a thermoplastic polymer, includes a binder to consolidate the fibers. This makes it possible to further enhance the mechanical stability and sustained use strength of the material.

In an advantageous development of the invention, an acid-resistant binder, more particularly an acrylate binder, is provided. This further enhances the sustained use strength of the material.

In an advantageous development of the invention, the binder has a weight fraction of 5 to 25 percent, based on the material. The further fractions of the textile material of the present invention consist of the glass fibers and optionally further additives. Advantageously, the predominant weight fraction is formed by the glass fibers. In an advantageous development of the invention, the textile material of the present invention can consist of the mixture of glass fibers and fibers composed of a thermoplastic polymer with or without the binder.

The textile sheetlike material of the present invention is suitable for the planned purpose of coating battery electrodes, more particularly in material thicknesses of 0.2 to 0.3 mm, for example 0.25 mm.

In an advantageous development, a planar, plate-shaped battery electrode includes a planar electrode grid arranged in a frame, wherein the electrode grid is coated with a pasty active mass and the active mass is covered with a covering layer of a textile sheetlike material according to any preceding claim.

In an advantageous development of the invention, a battery includes at least two electrodes, the pasty active mass of which has a covering layer of the material of the present invention applied to it. Furthermore, the electrodes are insulated from each other by interposition between the electrodes of a separator which, in an advantageous embodiment, includes glass fibers.

The separator can also consist wholly of glass fibers. The glass fiber fraction in the invention textile sheetlike material of the covering layer provides a synergistic effect by improving the contact between the covering layer and the separator compared with prior art materials for the covering layer, thereby improving the contact of the electrodes with the electrolyte. This increases the efficiency of the battery.

Figure 2:
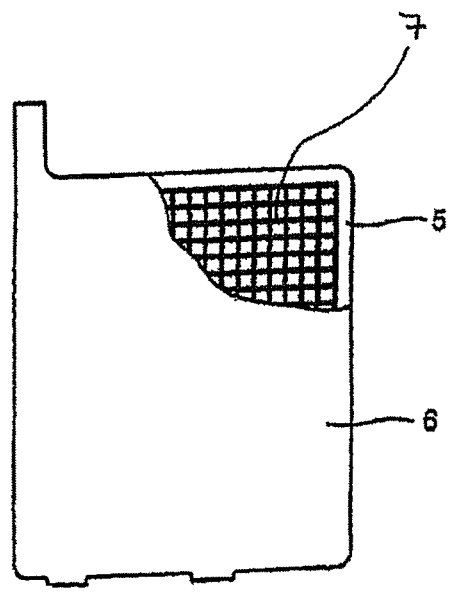
Figure 3:
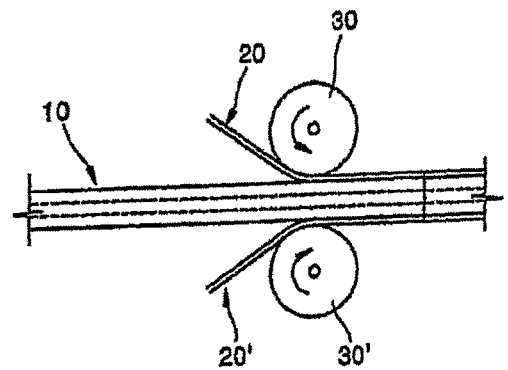
Figure 4:
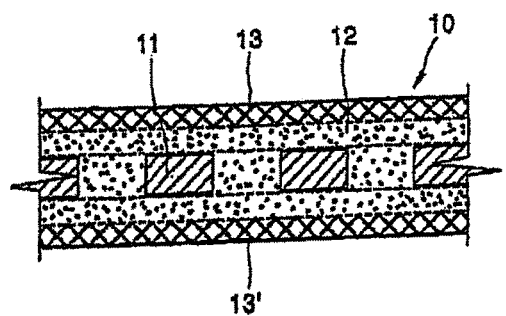

Exemplary embodiments of the invention will now be more particularly described with reference to drawings, where FIG. 1 shows a sectional view of a battery,
FIG. 2 shows a side view of a battery electrode,
FIG. 3 shows a manufacturing process for electrodes, and
FIG. 4 shows a sectional depiction of an electrode.

DETAILED DESCRIPTION

The battery depicted in FIG. 1 includes a plurality of positive electrodes 1 and negative electrodes 2. The electrodes 1, 2 are each coated with a pasty active mass. An insulating separator 3 is provided between the electrodes 1, 2. The electrodes 1, 2 and the separator 3 are arranged in a battery housing 4 which, to complete the fabrication of the battery, is filled with the liquid electrolyte, for example sulfuric acid. As is apparent from FIG. 2, an electrode consists of a gridlike structure 7 with a frame 5. The electrode is for example produced from lead in a casting or stamping process. The active material in the form of a paste is applied to the lead material of the electrode in the manufacturing process. The covering layer 6 is applied to the active material. The known materials mentioned at the beginning can be used for this.

The textile sheetlike material according to the invention includes glass fibers and fibers composed of a thermoplastic polymer, for example polyester fibers. Advantageously, a mixture of the glass fibers and fibers of a thermoplastic polymer is produced. The fibers may be in some form of crosslinkage with each other. The material can consist of an assemblage of fibers in any form, for example as nonwoven fabric, woven fabric, loop-formingly knitted fabric or loop-drawingly knitted fabric. Depending on the textile structure, it may also be advantageous to use a yarn which includes fibers composed of glass fibers and of a thermoplastic polymer.

FIG. 3 depicts an advantageous way of producing the invention electrode with the covering layer of the textile sheetlike material. First, a strip-shaped electrode material (electrode strip) 10, which has a grid-shaped structure, is produced. The electrode strip 10 can be brought into the desired form depicted in FIG. 2 using production steps such as casting, rolling and/or stamping. The electrode strip 10 is then guided in a machine through pressure rolls 30 and 30'. The pressure rolls 30, 30' press a likewise strip-shaped textile sheetlike material 20, 20', which includes glass fibers and polyester fibers and unrolls off a stock reservoir reel, onto the electrode strip 10 from both sides. Finally, the individual electrode plates are divided off the electrode strip using a stamping machine for example.

FIG. 4 depicts part of a cross section through a battery fabricated in accordance with the process described above. It is apparent that grid bars 11 of the lead electrode 10 are covered with the pasty active mass 12 on both sides. The active mass 12 is also present in the vacant spaces of the grid. On each side of the active mass 12 is a covering layer 13 which includes glass fibers and polyester fibers.

What is claimed is:

1. An assembly comprising:
    at least one planar, plate-shaped electrode comprising a grid of an electrode material arranged in a frame;
    a pasty active mass covering both sides of the planar, plate-shaped electrode;
    a battery electrode covering material comprising a yarn consisting essentially of glass fibers, a binder and fibers of a thermoplastic polymer which directly covers the pasty active mass; and
    at least one separator arranged on the battery electrode covering material such that the battery electrode covering material is sandwiched between the pasty active mass and the separator,
    wherein the predominant weight fraction of the battery electrode covering material of 50% to 90% is formed by the glass fibers, wherein the binder is provided to consolidate the fibers, wherein each of the glass fibers and the fibers composed of a thermoplastic polymer are finely fibrous having a diameter of less than 6 microns, and wherein the battery electrode covering material is arranged on both sides of the planar, plate-shaped electrode.

2. The assembly of claim 1, wherein the fibers are bound in an acrylic resin.

3. The assembly of claim 1, wherein the battery electrode covering material comprises a non-woven fabric.

4. The assembly of claim 1, wherein the battery electrode covering material is a fleece material comprising nonwoven fabric.

5. The assembly of claim 4, wherein the non-woven fabric is a fabric without holes and tears.

6. The assembly of claim 1, wherein the binder has a weight fraction of about 5 to about 25 percent.

7. The assembly of claim 1, wherein the binder has a weight fraction of about 15 to about 21 percent.

8. The assembly of claim 1, wherein the fibers composed of a thermoplastic polymer include polyester fibers.

9. The assembly of claim 1, wherein the fibers composed of a thermoplastic polymer have a weight fraction of about 5 to about 25 percent.

\* \* \* \* \*